(12) United States Patent
Ma et al.

(10) Patent No.: US 11,815,950 B2
(45) Date of Patent: Nov. 14, 2023

(54) CLAMSHELL TABLET PROTECTIVE CASE

(71) Applicants: Wenhong Ma, Guangdong (CN); Jiawei Gao, Guangdong (CN)

(72) Inventors: Wenhong Ma, Guangdong (CN); Jiawei Gao, Guangdong (CN)

(73) Assignee: Guangdong Shuowei Technology Co., Ltd., Dongguan (CN)

( * ) Notice: Subject to any disclaimer, the term of this patent is extended or adjusted under 35 U.S.C. 154(b) by 0 days.

(21) Appl. No.: 18/207,675

(22) Filed: Jun. 9, 2023

(65) Prior Publication Data
US 2023/0315149 A1   Oct. 5, 2023

(51) Int. Cl.
G06F 1/16   (2006.01)
A45F 5/00   (2006.01)

(52) U.S. Cl.
CPC ............. *G06F 1/1628* (2013.01); *A45F 5/00* (2013.01); *A45F 2200/0525* (2013.01)

(58) Field of Classification Search
CPC ... G06F 1/1628; A45F 5/00; A45F 2200/0525
See application file for complete search history.

(56) References Cited

U.S. PATENT DOCUMENTS

| 8,887,902 B1 * | 11/2014 | Liu ................... G06F 1/1626 206/320 |
| 9,980,543 B2 | 5/2018 | Ma et al. |
| 2012/0111881 A1 * | 5/2012 | Gaddis ............... H05K 5/023 220/752 |

FOREIGN PATENT DOCUMENTS

CN       104765416 B  *  3/2020  ............. A45C 11/00

\* cited by examiner

*Primary Examiner* — Michael C Zarroli

(57) ABSTRACT

A protective case includes a protective case assembly and a stand assembly disposed in the protective case assembly. The protective case assembly includes a bottom cover. A convex ring is arranged at one side of the bottom cover and a gear ring is arranged on the inner circle of the convex ring. A metal dome works with the gear ring to adjust the angle of the lower stand cover. Both the stand assembly and the protective case assembly can be disassembled, separately used, and separately replaced in case of damage. A support strip after being flipped over is positioned and unlocked via a button. The support strip is locked by a positioning buckle when recovery.

10 Claims, 13 Drawing Sheets

CLAMSHELL TABLET PROTECTIVE CASE

BACKGROUND OF THE INVENTION

1. Field of the Invention

The invention relates to electronic product accessories and more particularly to a clamshell tablet protective case having improved characteristics.

2. Description of Related Art

Protective cases are divided into three types: hard, soft and soft-hard combination, and often used to protect digital electronic products from accidental fall and wear.

At present, commercially available clamshell protective cases have defects in stand positioning and are difficult to provide effective support, most of which can only provide fixed support for electronic products which are not easy to be adjusted. Moreover, conventional protective cases have disadvantages in terms of replacement, wear resistance, etc., and cannot meet the needs of users.

Thus, the need for improvement still exists.

SUMMARY OF THE INVENTION

To achieve the above object, the invention provides the following technical solutions: the clamshell tablet protective case, comprising the protective case assembly and the stand assembly arranged inside the protective case assembly, wherein the protective case assembly comprises the bottom cover through which an electronic product is inserted in, the convex ring is arranged at one side of the bottom cover and the gear ring is arranged on the inner circle of the convex ring;

The stand assembly comprises the lower cover, the upper cover, the square support plate, and the support strip which are movably arranged inside the convex ring. The movable groove is opened at the bottom of the lower stand cover, and the limit chute I and the limit chute II are opened at both sides of the inner wall of the movable groove. The square support plate is movably arranged inside the movable groove and one end of the square support plate is rotationally arranged inside the limit chute II, the support strip is movably arranged inside the movable groove and one end of the support strip is slidably arranged inside the limit chute I, and one end of the square support plate away from the limit chute II is rotationally arranged inside the support strip;

One end of the support strip away from the limit chute I is flipped over, and the other end of the support strip slides inside the limit chute I, meanwhile, the support strip pulls one end of the square support plate away from the limit chute II, and the other end of the square support plate rotates inside the limit chute II, so that the support strip, the square support plate and the movable groove are combined in a triangular shape;

The button is arranged between the two limit chutes I inside the movable groove, used for clamping the flipped-over support strip to position the support strip in flip-over state;

The positioning buckle is arranged between the two limit chutes II inside the movable groove, used for clamping the recovered support strip to position the support strip in recovery state;

The metal dome clamped to the gear ring is arranged at the top of the lower stand cover, and the metal dome sequentially contacts the teeth on the gear ring as the lower stand cover rotates to position the lower stand cover.

As a preferred technical solution of the invention, the lower stand cover and the upper stand cover are located on opposite sides of the gear ring, respectively, at least one connecting groove is arranged inside the lower stand cover, and studs are arranged inside the connecting groove.

As a preferred technical solution of the invention, at least one connecting base inserted into the connecting groove is arranged at the bottom of the upper stand cover, and screw holes coaxially arranged with the studs are opened inside the connecting groove, through which bolts are installed to lock the lower stand cover and the upper stand cover.

As a preferred technical solution of the invention, the connecting shaft I is arranged at one end of the square support plate, the connecting shaft II is arranged at the other end; one end of the connecting shaft II extends to the inside of the limit chute II; and the connecting hole connected to the connecting shaft I is opened inside the support strip.

As a preferred technical solution of the invention, the connecting pin slidably connected to the inside of the limit chute I is arranged at one end of the support strip, the bottom surface of the button is inclined, and the positioning groove clamped to the positioning buckle is arranged at the top of the support strip.

As a preferred technical solution of the invention, the limit protrusion I is arranged inside the limit chute I to limit the sliding distance of the positioning pin, and the limit protrusion II is arranged inside the limit chute II to restrict the connecting shaft II from sliding inside the limit chute II.

As a preferred technical solution of the invention, the slot is arranged at the top edge of the lower stand cover, and the metal dome is movably inserted into the slot.

As a preferred technical solution of the invention, the protective case assembly further comprises the bottom shell for mounting the bottom cover, the bottom of the convex ring runs through to the bottom of the bottom shell, so that the bottom shell is pushed up when the convex ring contacts the table.

As a preferred technical solution of the invention, the protective case assembly further comprises the top cover arranged on the bottom cover, buckles are arranged around the bottom cover, buckle grooves are arranged around the top cover, and one end of the buckle grooves extends to the place between the bottom cover and the bottom shell and is clamped to the buckle.

As a preferred technical solution of the invention, at least one sponge is embedded inside the bottom cover, and limit ribs are arranged on the internal circumferential walls of the bottom cover.

The invention has the following advantages and benefits in comparison with the conventional art:

The clamshell tablet protective case has waterproof, dust-proof and drop-proof features to protect electronic products such as mobile phones and tablets. The metal dome works with the gear ring to adjust the angle of the lower stand cover, and the metal dome has good wear resistance and high durability to achieve multi-angle adjustment support. Both the stand assembly and the protective case assembly of the product can be disassembled, separately used, and separately replaced in case of damage for cost saving, convenient opening and closing. The support strip after being flipped over is positioned and unlocked via the button, which is simple and fast. The support strip is locked by the positioning buckle when recovery, which is not easy to shake.

The above and other objects, features and advantages of the invention will become apparent from the following detailed description taken with the accompanying drawings.

DETAILED DESCRIPTION OF THE INVENTION

Figure 1:
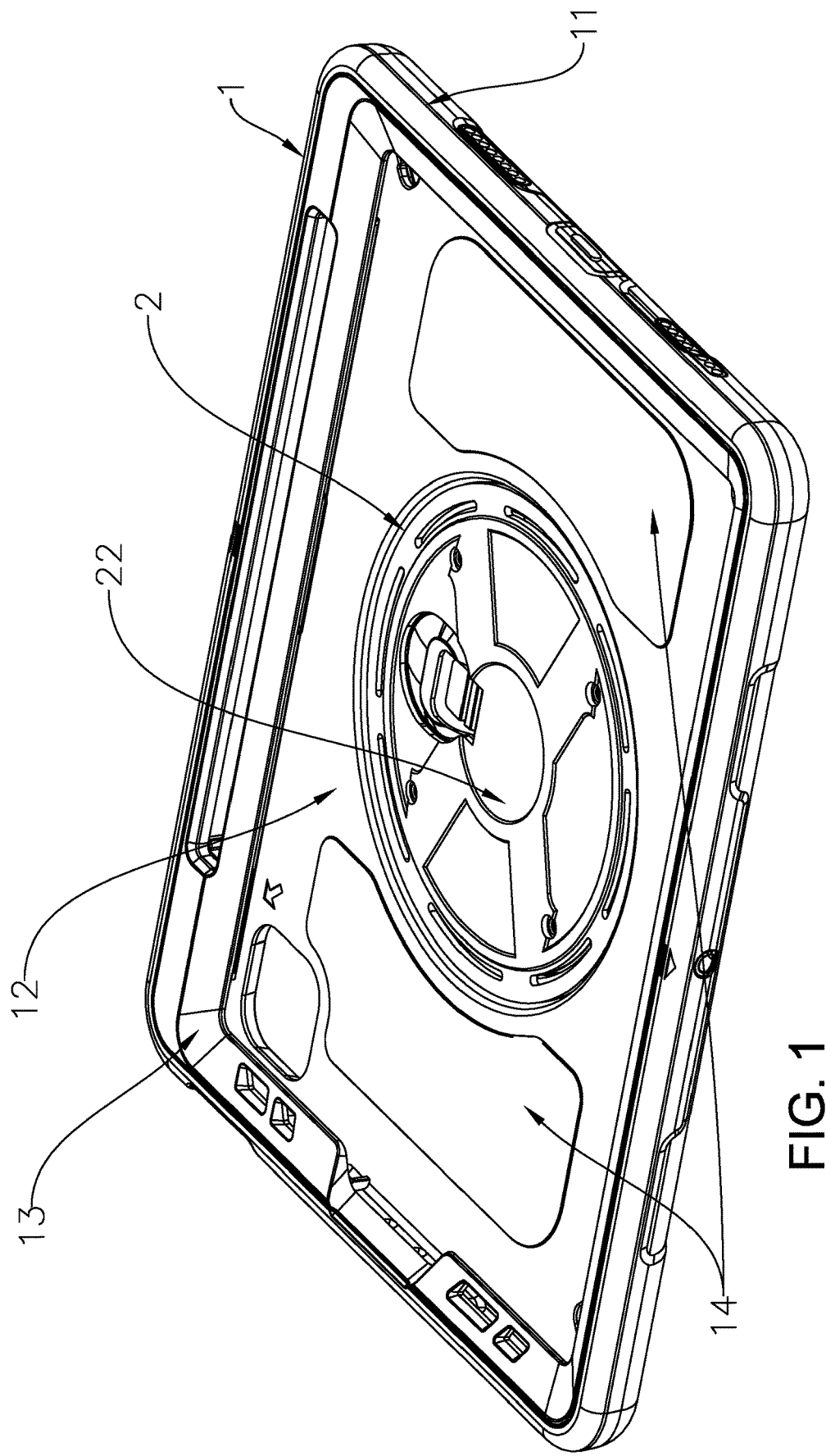
FIG. 1 is a perspective view of a clamshell tablet protective case according to a preferred embodiment of the invention.
Figure 2:
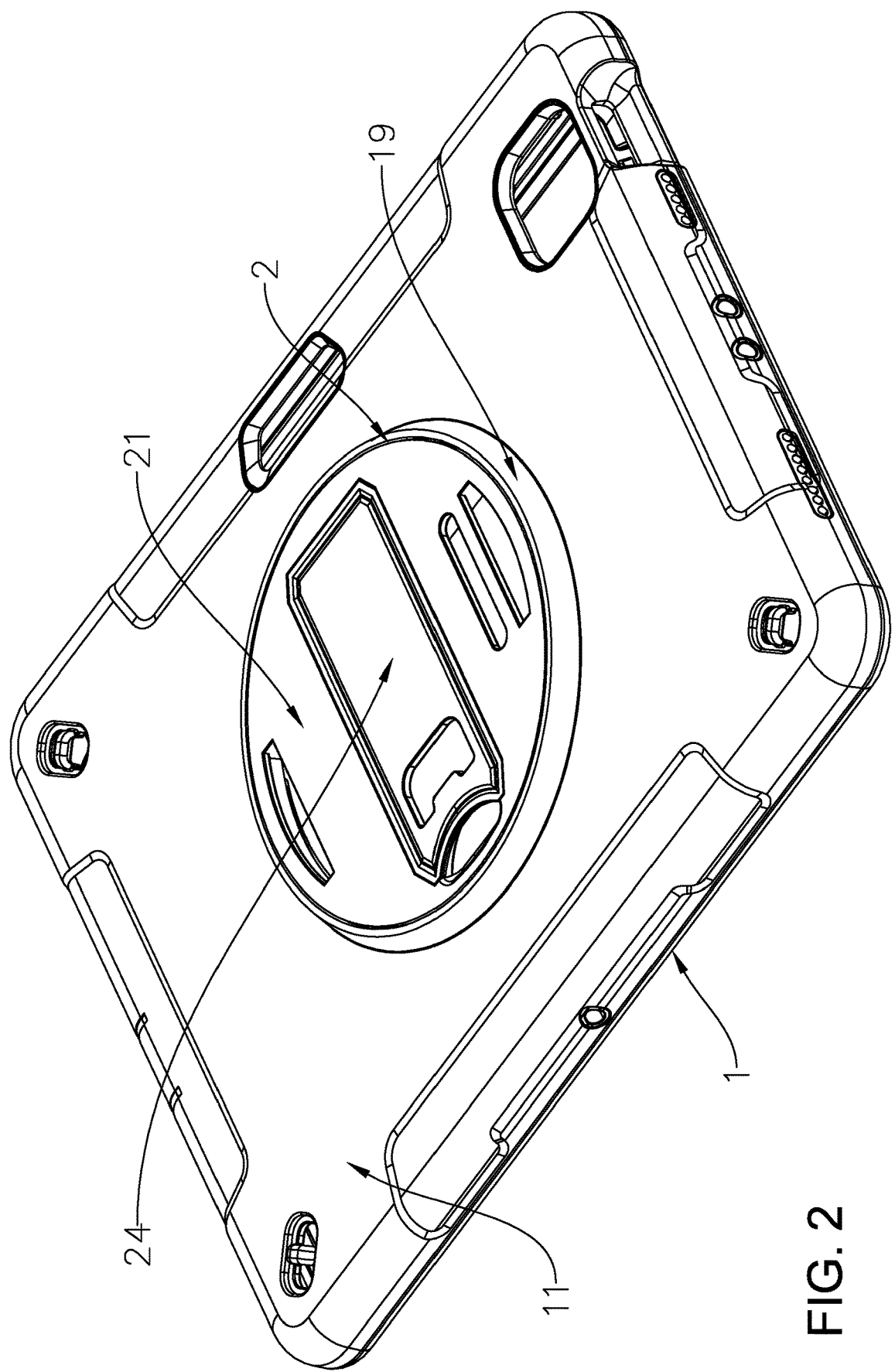
FIG. 2 is a perspective view of the bottom shell of the clamshell tablet protective case.

Referring to FIGS. 1 to 11, a clamshell tablet protective case in accordance with a first preferred embodiment of the invention comprises a protective case assembly 1 and a stand assembly 2 arranged inside the protective case assembly 1. The protective case assembly 1 comprises the bottom cover 12 through which an electronic product is inserted in, and the electronic product can be a display, an IPAD, and a mobile phone. The convex ring 19 is arranged at one side of the bottom cover 12 and the gear ring 191 is arranged on the inner circle of the convex ring 19.

The stand assembly 2 comprises the lower cover 21, the upper cover 22, the square support plate 23, and the support strip 24 which are movably arranged inside the convex ring 19. The movable groove 25 is opened at the bottom of the lower stand cover 21, and the limit chute I 251 and the limit chute II 252 are opened at both sides of the inner wall of the movable groove 25. The square support plate 23 is movably arranged inside the movable groove 25 and one end of the square support plate 23 is rotationally arranged inside the limit chute II 252, the support strip 24 is movably arranged inside the movable groove 25 and one end of the support strip 24 is slidably arranged inside the limit chute I 251, and one end of the square support plate 23 away from the limit chute II 252 is rotationally arranged inside the support strip 24.

One end of the support strip 24 away from the limit chute I 251 is flipped over, and the other end of the support strip 24 slides inside the limit chute I 251, meanwhile, the support strip 24 pulls one end of the square support plate 23 away from the limit chute II 252, and the other end of the square support plate 23 rotates inside the limit chute II 252, so that the support strip 24, the square support plate 23 and the movable groove 25 are combined in a triangular shape.

The button 26 is arranged between the two limit chutes I 251 inside the movable groove 25, used for clamping the flipped-over support strip 24 to position the support strip 24 in flip-over state.

The positioning buckle 254 is arranged between the two limit chutes II 252 inside the movable groove 25, used for clamping the recovered support strip 24 to position the support strip 24 in recovery state.

The metal dome 27 clamped to the gear ring 191 is arranged at the top of the lower stand cover 21, and the metal dome 27 sequentially contacts the teeth on the gear ring 191 as the lower stand cover 21 rotates to position the lower stand cover 21.

As a specific technical solution of the present embodiment, the lower stand cover 21 and the upper stand cover 22 are located on opposite sides of the gear ring 191, respectively, at least one connecting groove 211 is arranged inside the lower stand cover 21, and studs 212 are arranged inside the connecting groove 211.

As a specific technical solution of the present embodiment, at least one connecting base 221 inserted into the connecting groove 211 is arranged at the bottom of the upper stand cover 22, and screw holes 222 coaxially arranged with the studs 212 are opened inside the connecting groove 211, through which bolts are installed to lock the lower stand cover 21 and the upper stand cover 22. By fitting between the studs 212 and the screw holes 222, bolts are screwed into the screw holes 222 of the studs 212 to connect the lower stand cover 21 to the upper stand cover 22, which will not be separated from the convex ring 19, and will not affect the rotation of the lower stand cover 21 on the convex ring 19.

As a specific technical solution of the present embodiment, the connecting shaft I 231 is arranged at one end of the square support plate 23, the connecting shaft II 232 is arranged at the other end; one end of the connecting shaft II 232 extends to the inside of the limit chute II 252; the connecting hole 242 connected to the connecting shaft I 231 is opened in the support strip 24; when the connecting hole 242 is arranged and pulls the support strip 24, the support strip 24 drives the square support plate 23 to flip through the connecting hole 242 to achieve the linkage between the support strip 24 and the square support plate 23.

Figure 5:
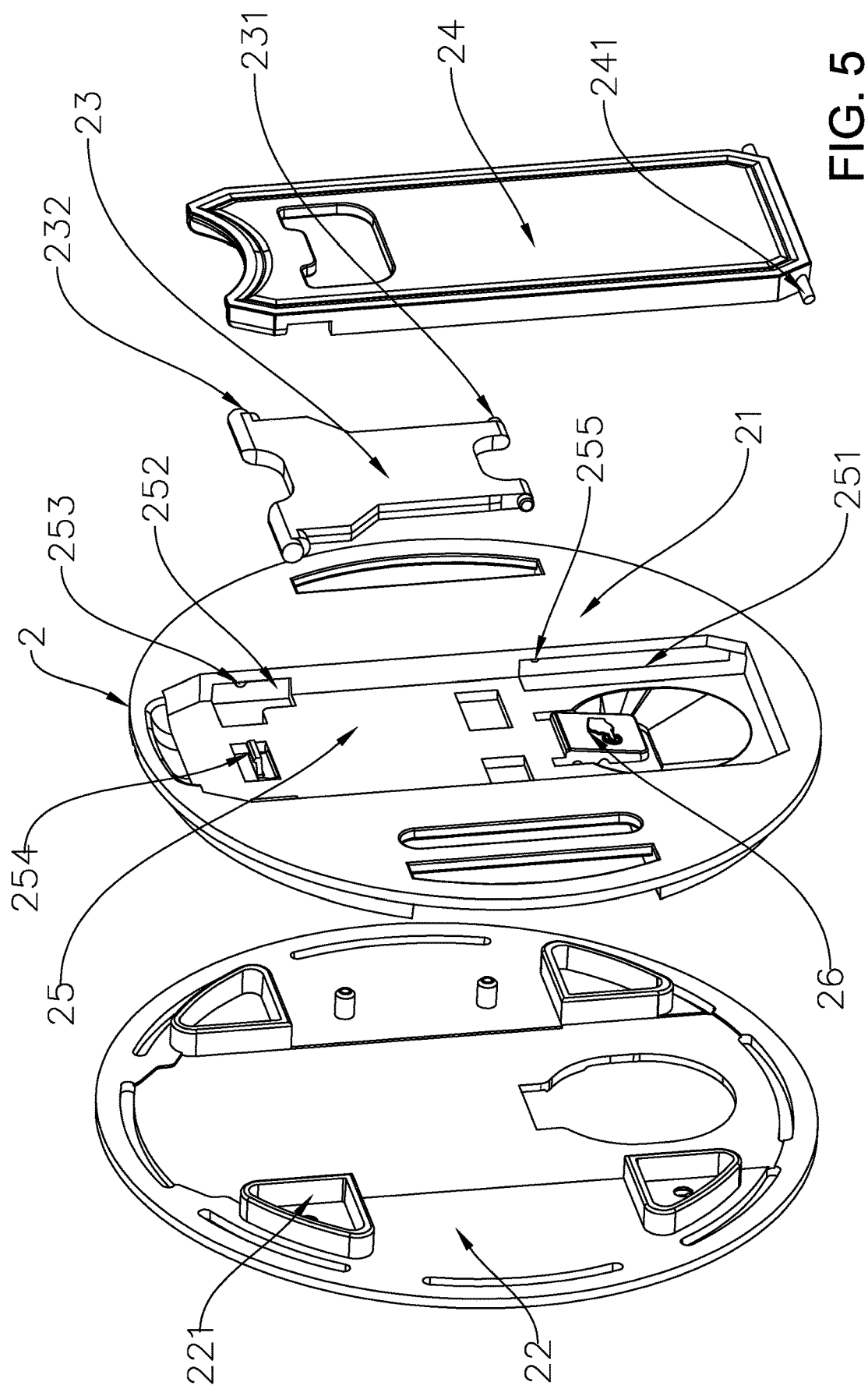
FIG. 5 is an exploded view of the stand assembly of the clamshell tablet protective case.
Figure 6:
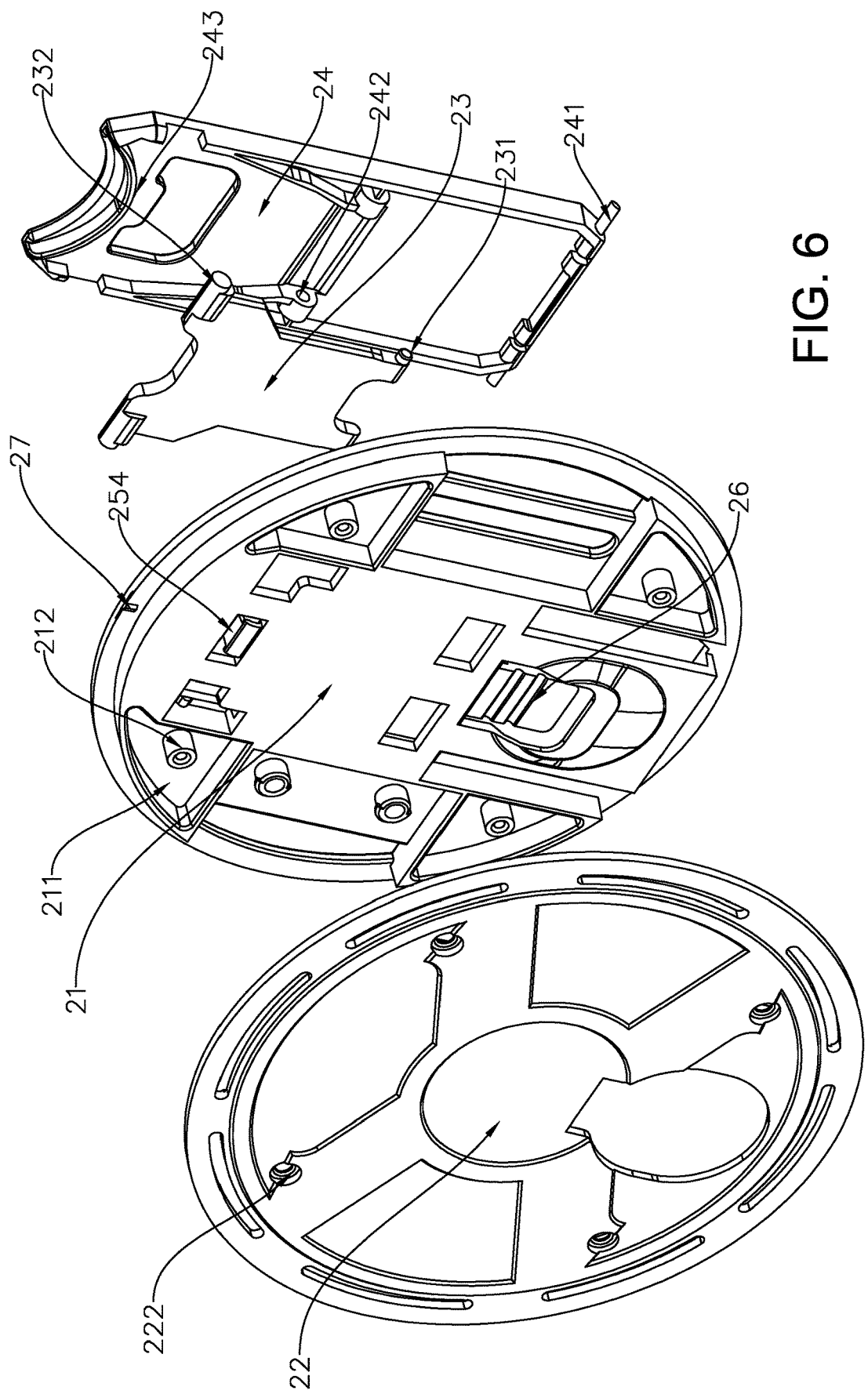
FIG. 6 is an exploded view of the stand assembly of the clamshell tablet protective case.
Figure 7:
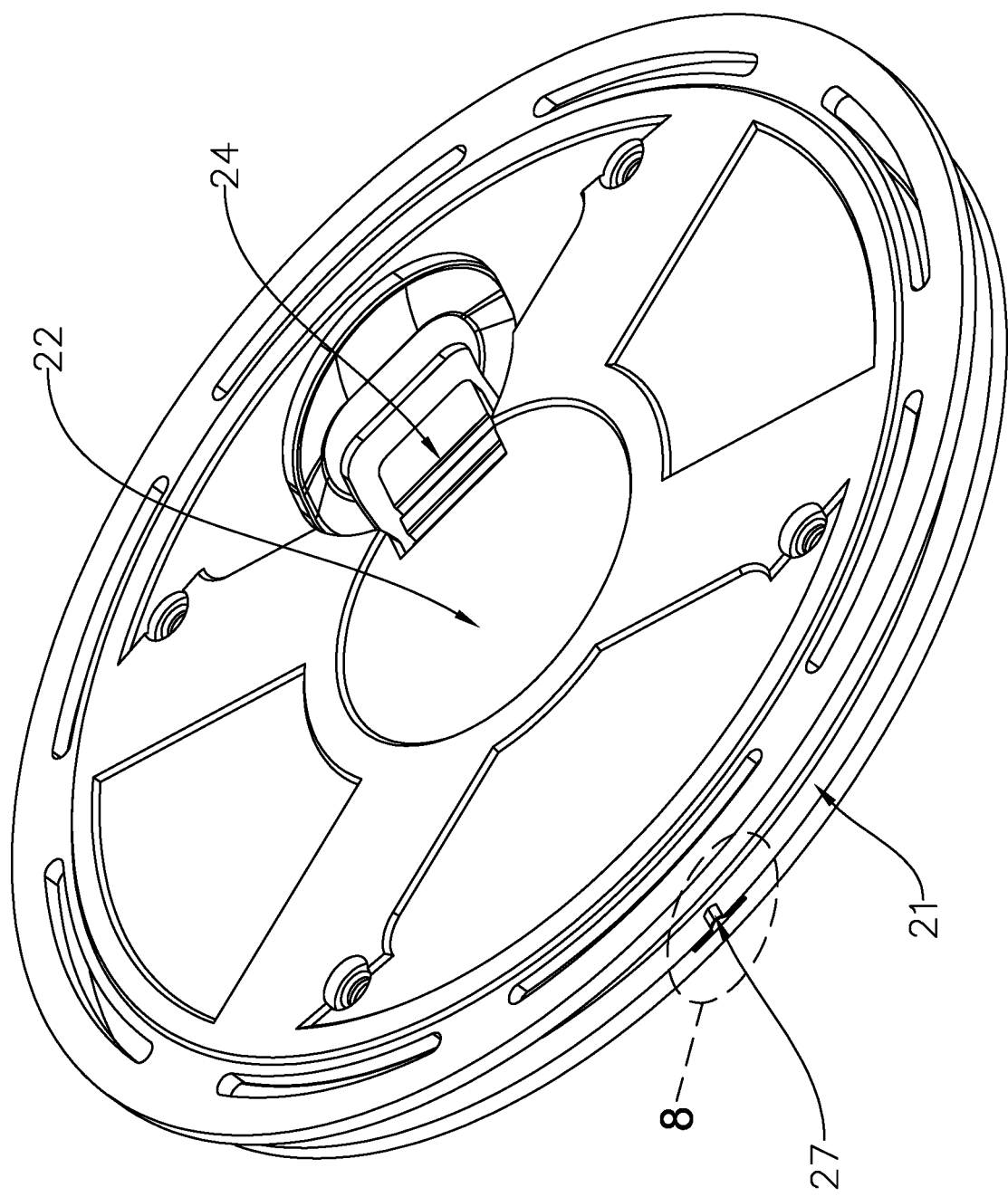
FIG. 7 is a perspective view of the stand assembly of the clamshell tablet protective case.
Figure 8:
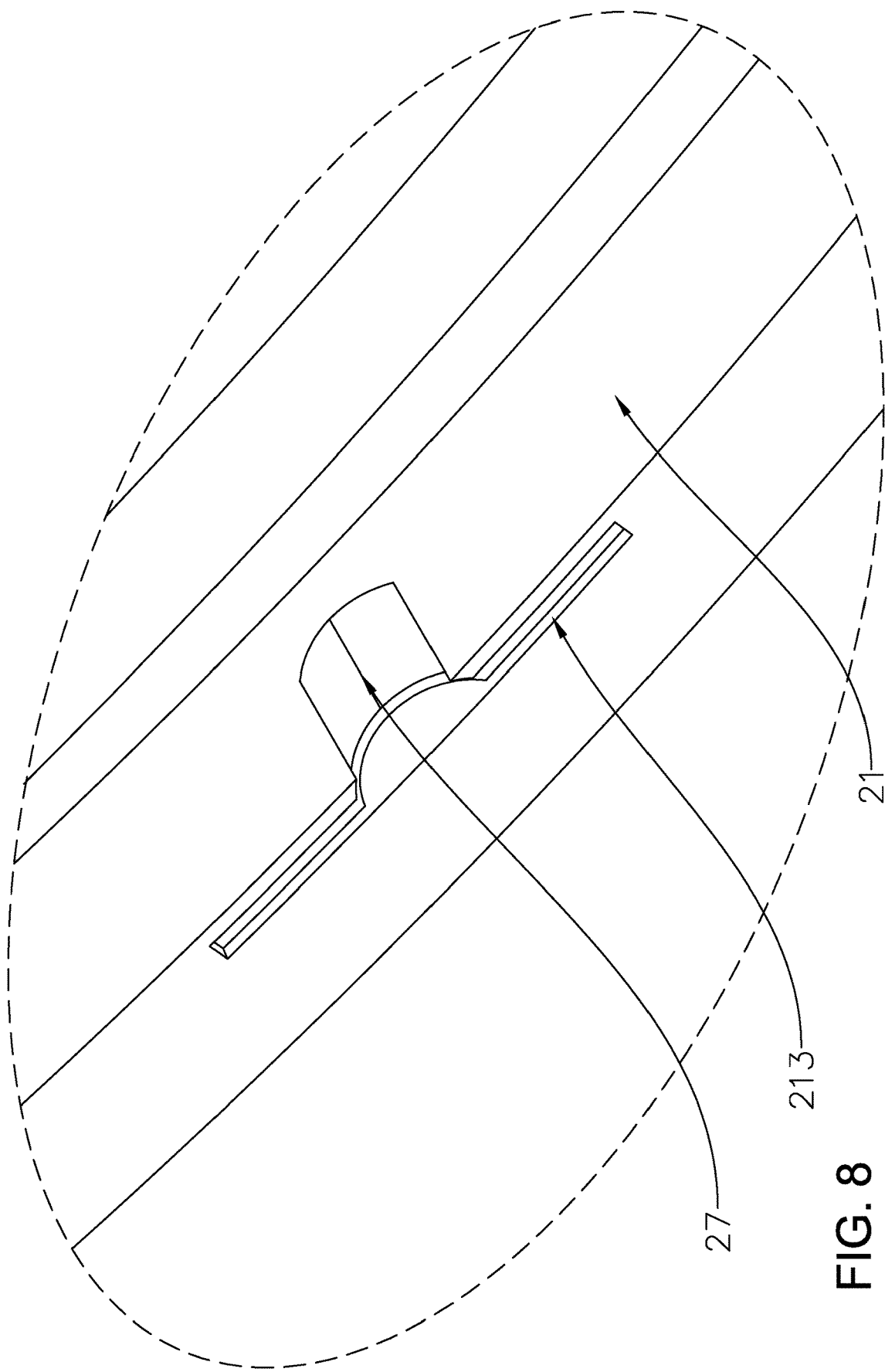
FIG. 8 is a detailed view of the area in oval 8 in FIG. 7.
Figure 9:
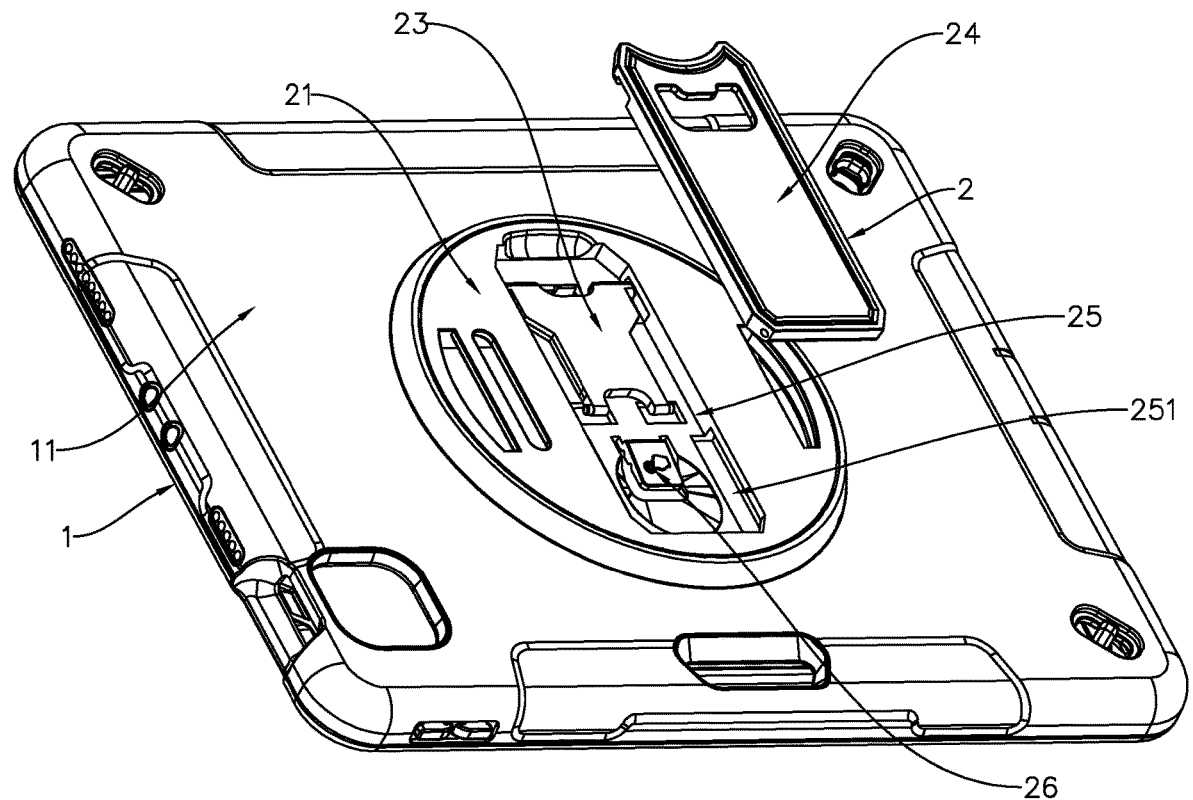
FIG. 9 is an exploded, perspective view of the square support plate of the clamshell tablet protective case.
Figure 10:
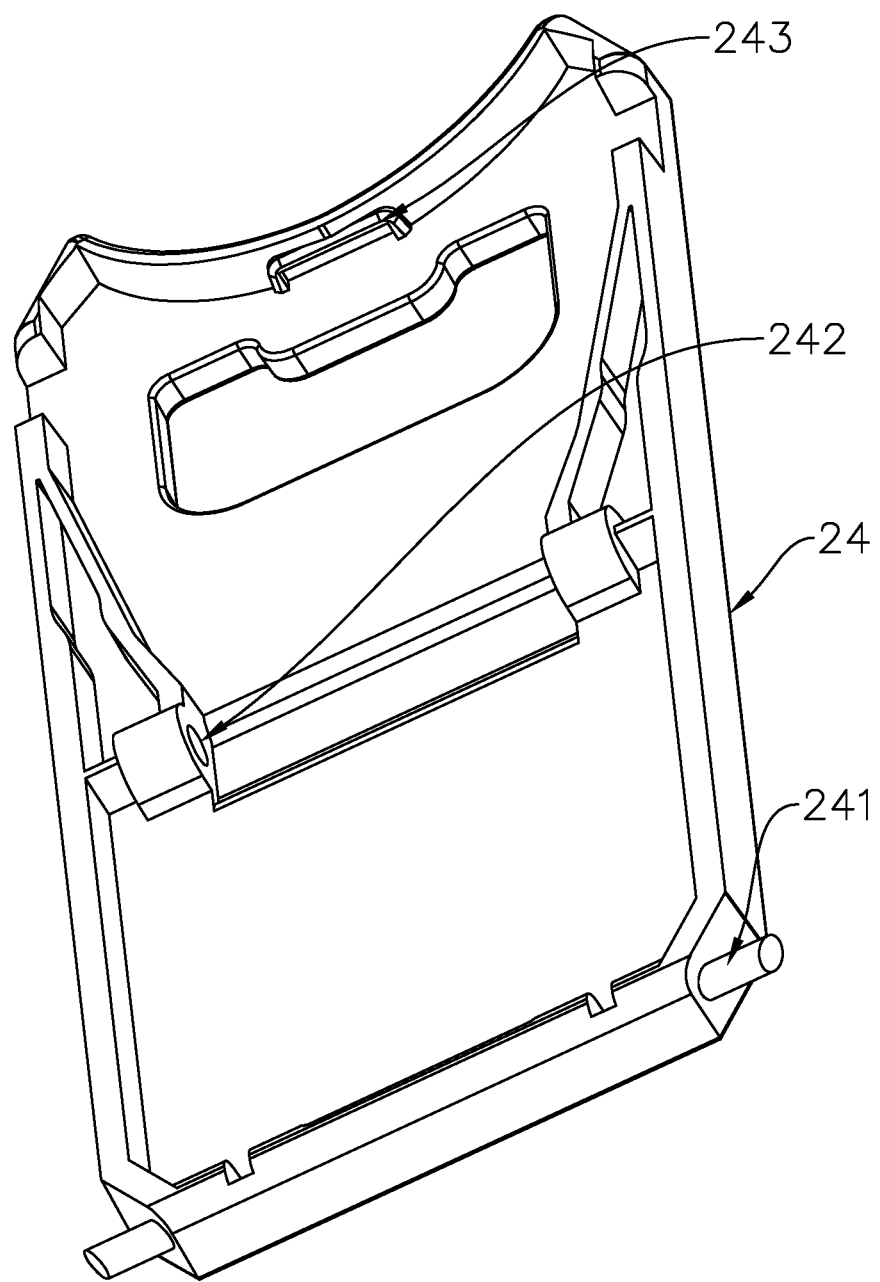
FIG. 10 is a perspective view of the positioning groove of the clamshell tablet protective case.
Figure 11:
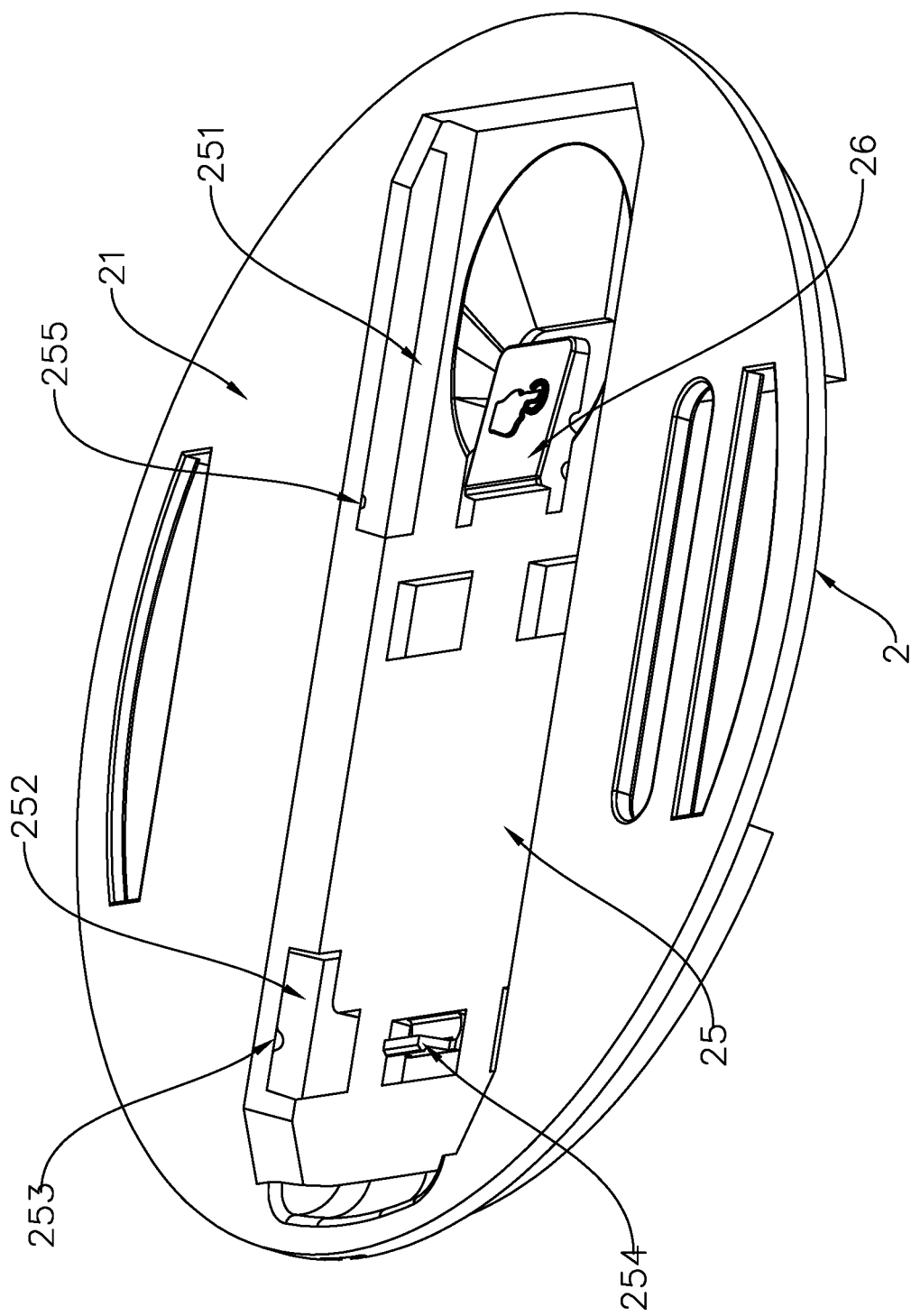
FIG. 11 is a perspective view of the limit protrusion I and the limit protrusion II of the clamshell tablet protective case.

As a specific technical solution of the present embodiment, the connecting pin 241 slidably connected to the inside of the limit chute I 251 is arranged at one end of the support strip 24, the bottom surface of the button 26 is inclined, and the positioning groove 243 clamped to the positioning buckle 254 is arranged at the top of the support strip 24. Referring to FIGS. 5 and 11, the bottom surface of the button 26 is inclined to allow one end of the support strip 24 to more smoothly slide onto the button 26; the support strip 24 is pulled to drive the connecting pin 241 to slide inside the limit chute 251. As the support strip 24 continues to flip over, one end of it presses against the button 26, which is under completely upward pressure from the support strip 24 since the bottom surface of the button 26 is inclined. When one end of the support strip 24 passes over the button 26, the button 26 is free from pressure and returns, so that the vertical surface at one side of the button 26 directly presses against one end of the support strip 24 to position the support strip 24, which can provide stable support for the protective case assembly 1. When the support strip 24 needs to be stored, the button 26 is pressed to free it from the pressure of the support strip 24, and the support strip 24 is pressed again to drive the connecting pin 241 to slide reversely inside the limit chute 251, so that the support strip 24 is finally laid flat inside the movable groove 25. Further, when the support strip 24 is stored, it drives the positioning groove 243 to be clamped to the positioning buckle 254, so that the support strip 24 is more stably laid flat inside the movable groove 25 without loose or fall off.

As a specific technical solution of the present embodiment, the limit protrusion I 253 is arranged inside the limit chute I 251 to limit the sliding distance of the positioning pin, and the limit protrusion II 255 is arranged inside the limit chute II 252 to restrict the connecting shaft II 232 from sliding inside the limit chute II 252. The limit protrusion I 253 is arranged to support the support strip 24 in combination with the button 26. When the connecting pin 241 slides over the limit protrusion I 253 inside the limit chute I 251, the support strip 24 is clamped to the button 26. The limit protrusion II 255 is used to prevent the connecting shaft II 232 from sliding inside the limit chute II 252, so that the connecting shaft II 232 is limited by the limit protrusion II 255 and can only rotate inside the limit chute II 252 with the flip of the support strip 24. The design of the longer limit chute II 252 is to facilitate the assembly and disassembly of the square support plate 23. The user can pull the square support plate 23 to allow the connecting shaft II 232 to press against the limit protrusion II 255 and pass it over, so that the connecting shaft II 232 is free from the limitation of the limit protrusion II 255 before disassembly.

As a specific technical solution of the present embodiment, the slot 213 is opened at the top edge of the lower stand cover 21. The metal dome 27 is movably inserted into the slot 213. The arrangement of the slot 213 facilitates the replacement of the metal dome 27 in case of damage to it. The metal dome 27 has good wear resistance and is compressed when it presses against the teeth of the gear ring 191. As the lower stand cover rotates, it constantly presses against the gear ring 191 and floats up and down, which is convenient for the user to adjust the rotation angle of the lower stand cover and position it in a simple and fast manner.

As a specific technical solution of the present embodiment, the protective case assembly 1 further comprises the bottom shell 11 for mounting the bottom cover 12, the bottom of the convex ring 19 runs through to the bottom of the bottom shell 11, so that the bottom shell 11 can be pushed up when the convex ring 19 contacts the table. The convex ring 19 arranged can be used to install the stand assembly 2, and push up the protective case assembly 1, which reduces the contact between the protective case assembly 1 and the table, and reduces contamination to it.

Figure 3:
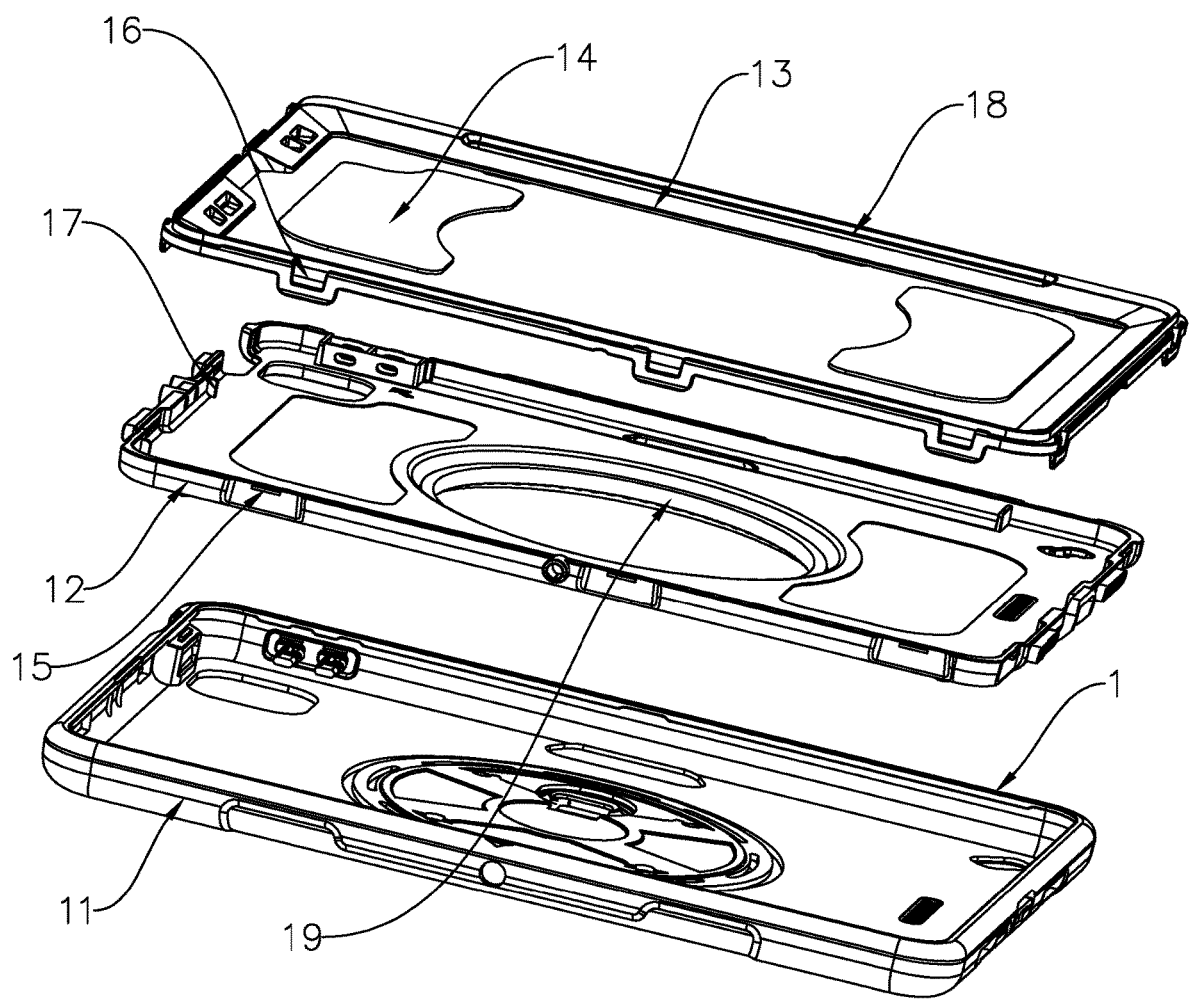
FIG. 3 is an exploded view of the protective case assembly of the clamshell tablet protective case.
Figure 4:
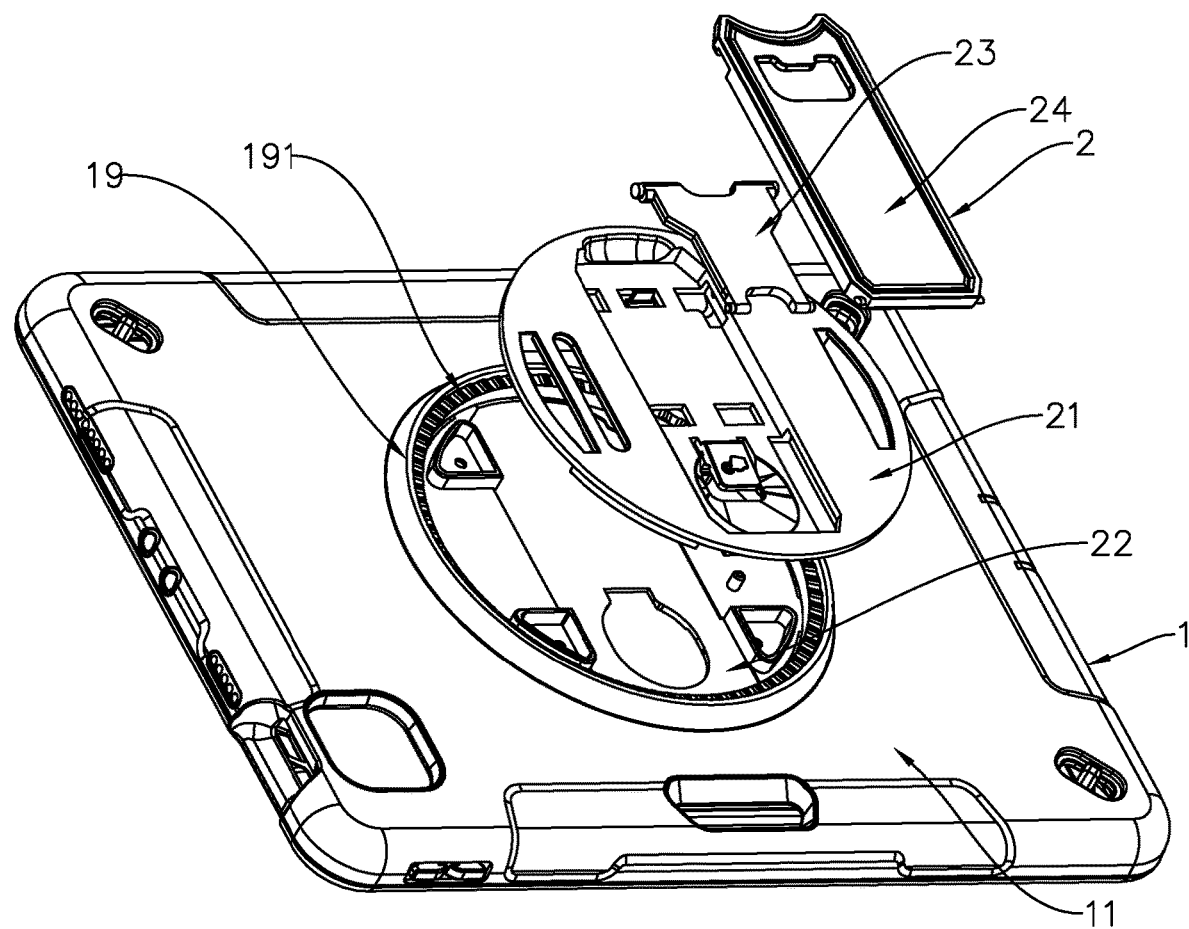
FIG. 4 is an exploded view of the convex ring of the clamshell tablet protective case.

As a specific technical solution of the present embodiment, the protective case assembly 1 further comprises the top cover 13 arranged on the bottom cover 12, buckles 15 are arranged around the bottom cover 12, buckle grooves 16 are arranged around the top cover 13, one end of the buckle grooves 16 extends to the place between the bottom cover 12 and the bottom shell 11 and is clamped to the buckle 15. Referring to FIG. 3, the storing groove 18 is arranged on the top of the top cover 13 for storing the stylus, the top cover 13 is tightened on the bottom cover 12 with the buckle 15, which is easily operated.

As a specific technical solution of the present embodiment, at least one sponge 14 is embedded inside the bottom cover 12. The limit ribs 17 are arranged on the internal circumferential walls of the bottom cover 12, and used to control the distance between an electronic product and the border of the bottom cover 12, which reduces the damage to the electronic product upon collision, and further protects the safety of the product during use by buffering collision of the bottom of the product.

Figure 12:
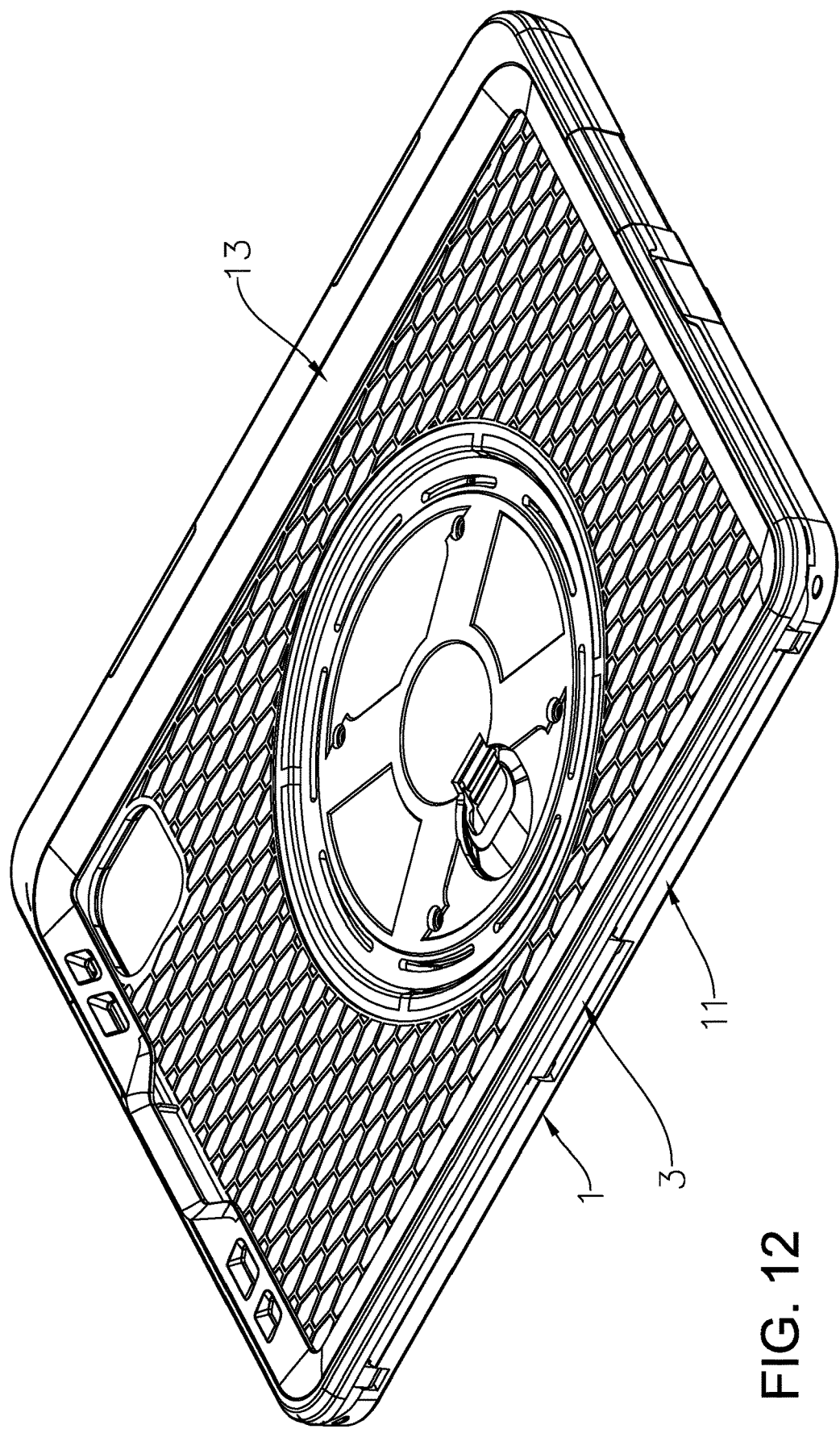
FIG. 12 is a perspective view of a clamshell tablet protective case according to a second preferred embodiment of the invention.
Figure 13:
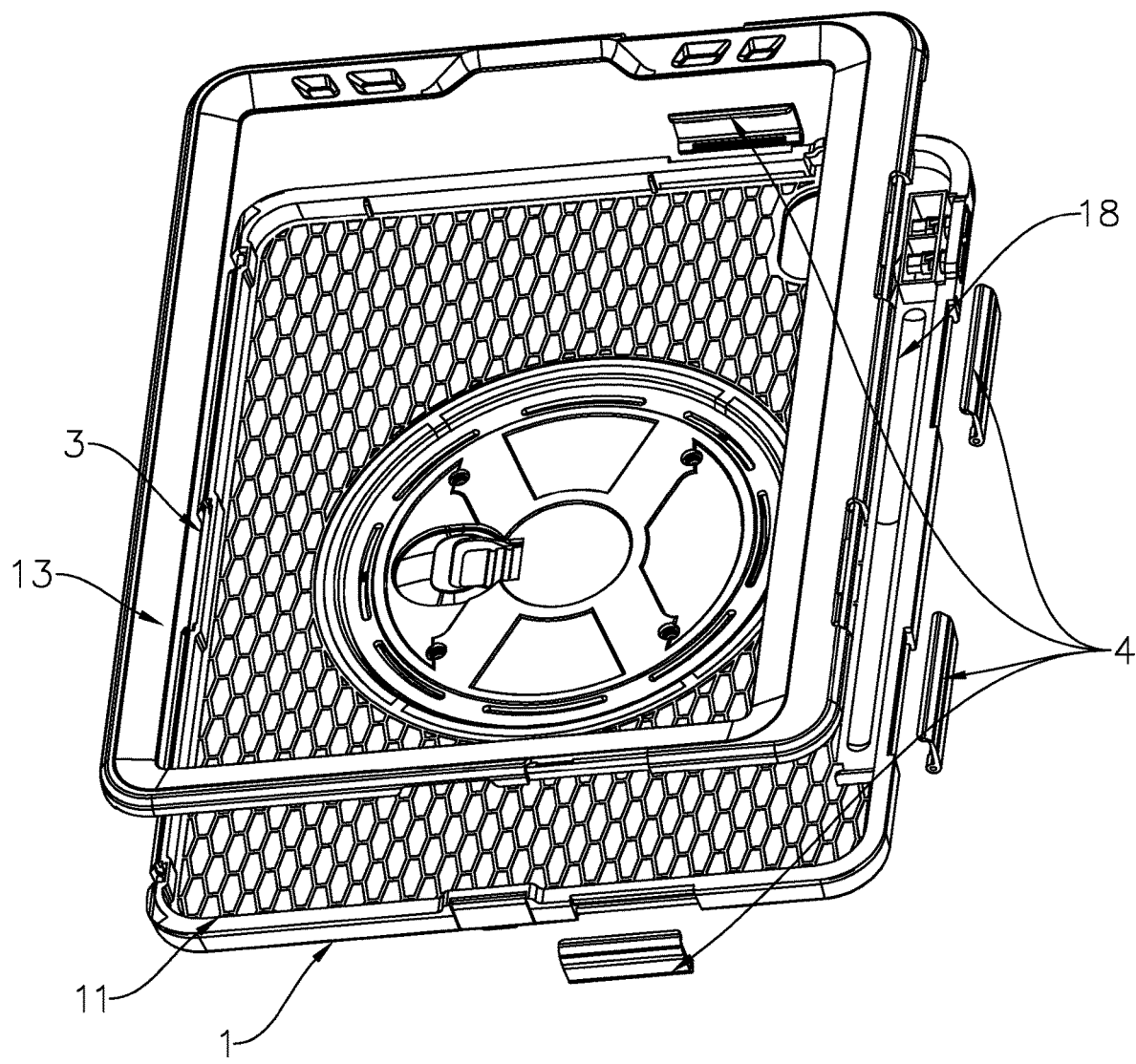
FIG. 13 is an exploded view of the clamshell tablet protective case in FIG. 12.

Referring to FIGS. 12 to 13, a clamshell tablet protective case in accordance with a second preferred embodiment of the invention is shown. The characteristics of the second preferred embodiment are substantially the same as that of the first preferred embodiment except the following: the protective case assembly 1 in this embodiment adopts a clamshell-type structure compared with the above embodiment. An articulation piece is arranged on one side of the bottom shell 11 and articulated with the top cover 13, and hoops are arranged on the other three sides of the bottom shell 11 for clamping the top cover 13. This design scheme greatly improves the efficiency of assembling electronic products. When pulling the hoops to disconnect from the top cover 13, the top cover 13 can be turned over before installing or removing the electronic product. In addition, due to the use of clamping ribs between the top cover 13 and the bottom shell 11, sealing rubber strip can be installed on the top cover 13 and between the top cover 13 and the bottom shell 11 in later period. When the sealing rubber strip is directly compressed after the top cover 13 is connected to the bottom shell 11, the product is further sealed and has excellent waterproof and dustproof effects. At the same time, the storage groove 18 is moved from the top cover 13 to the inside of the bottom cover 12.

The invention has the following advantages and benefits in comparison with the conventional art: the clamshell tablet protective case comprises the stand assembly 2 and the protective case assembly 1 both of which can be disassembled, separately used, and separately replaced in case of damage for cost saving. The metal dome 27 works with the gear ring 191 to adjust the angle of the lower stand cover 21, and the metal dome 27 has good wear resistance and high durability. The support strip 24 after being flipped over is positioned and unlocked via the button 26, which is simple and fast. The support strip 24 is locked by the positioning buckle 254 when recovery, which is not easy to shake.

While the invention has been described in terms of preferred embodiments, those skilled in the art will recognize that the invention can be practiced with modifications within the spirit and scope of the appended claims.

What is claimed is:
1. A protective case for an electronic product, comprising:
   a protective case assembly; and
   a stand assembly arranged inside the protective case assembly,
   wherein the protective case assembly comprises a bottom cover through which the electronic product is inserted in, a convex ring is arranged at one side of the bottom cover and a gear ring is arranged on the inner circle of the convex ring;
   wherein the stand assembly comprises a lower cover, an upper cover, a square support plate, and a support strip which are movably arranged inside the convex ring;
   wherein a movable groove is opened at the bottom of the lower stand cover, and a first limit chute and a second limit chute are opened at both sides of the inner wall of the movable groove;
   wherein the square support plate is movably arranged inside the movable groove and one end of the square support plate is rotationally arranged inside the second limit chute, the support strip is movably arranged inside the movable groove and one end of the support strip is slidably arranged inside the first limit chute, and one end of the square support plate away from the second limit chute is rotationally arranged inside the support strip;

wherein one end of the support strip away from the first limit chute is flipped over, and the other end of the support strip slides inside the first limit chute, meanwhile, the support strip pulls one end of the square support plate away from the second limit chute, and the other end of the square support plate rotates inside the second limit chute, so that the support strip, the square support plate, and the movable groove are combined in a triangular shape;

wherein a button is arranged between the two first limit chutes inside the movable groove, used for clamping the flipped-over support strip to position the support strip in flip-over state;

wherein a positioning buckle is arranged between the two second limit chutes inside the movable groove, used for clamping the recovered support strip to position the support strip in recovery state; and wherein a metal dome clamped to the gear ring is arranged at the top of the lower stand cover, and the metal dome sequentially contacts the teeth on the gear ring as the lower stand cover rotates to position the lower stand cover.

2. The protective case of claim 1, wherein the lower stand cover and the upper stand cover are located on opposite sides of the gear ring, respectively, at least one connecting groove is arranged inside the lower stand cover, and studs are arranged inside the connecting groove.

3. The protective case of claim 1, wherein at least one connecting base inserted into the connecting groove is arranged at the bottom of the upper stand cover, and screw holes coaxially arranged with the studs are opened inside the connecting groove, through which bolts are installed to lock the lower stand cover and the upper stand cover.

4. The protective case of claim 1, wherein a first connecting shaft is arranged at one end of the square support plate, a second connecting shaft is arranged at the other end; one end of the second connecting shaft extends to the inside of the second limit chute; and a connecting hole connected to the first connecting shaft is opened inside the support strip.

5. The protective case of claim 4, wherein a connecting pin slidably connected to the inside of the first limit chute is arranged at one end of the support strip, the bottom surface of the button is inclined, and a positioning groove clamped to the positioning buckle is arranged at the top of the support strip.

6. The protective case of claim 5, wherein a first limit protrusion is arranged inside the first limit chute to limit the sliding distance of the positioning pin, and a second limit protrusion is arranged inside the second limit chute to restrict the second connecting shaft from sliding inside the second limit chute.

7. The protective case of claim 1, wherein a slot is arranged at the top edge of the lower stand cover, and the metal dome is movably inserted into the slot.

8. The protective case of claim 1, wherein the protective case assembly further comprises a bottom shell for mounting the bottom cover, the bottom of the convex ring runs through to the bottom of the bottom shell, so that the bottom shell is pushed up when the convex ring contacts the table.

9. The protective case of claim 1, wherein the protective case assembly further comprises a top cover arranged on the bottom cover, buckles are arranged around the bottom cover, buckle grooves are arranged around the top cover, and one end of the buckle grooves extends to the place between the bottom cover and the bottom shell and is clamped to the buckle.

10. The protective case of claim 1, wherein at least one sponge is embedded inside the bottom cover, and limit ribs are arranged on the internal circumferential walls of the bottom cover.

* * * * *